United States Patent

Shelor et al.

Patent Number: 5,823,760
Date of Patent: Oct. 20, 1998

[54] METHOD OF OPERATING A COMBINED CYCLE POWER PLANT

[75] Inventors: F. Mack Shelor, Riva; Robert Bianco, Edgewater, both of Md.

[73] Assignee: Wartsila Diesel, Inc., Annapolis, Md.

[21] Appl. No.: 661,172

[22] Filed: Jun. 10, 1996

Related U.S. Application Data

[63] Continuation-in-part of Ser. No. 352,124, Dec. 1, 1994, Pat. No. 5,525,053.

[51] Int. Cl.$^6$ .................................................. F23D 14/00
[52] U.S. Cl. .................................. 431/5; 431/2; 431/11; 431/12; 122/7 R
[58] Field of Search ............................ 431/2, 5, 12, 11; 122/7 R, 1 R; 123/2; 60/303

[56] References Cited

U.S. PATENT DOCUMENTS

| Patent No. | Date | Inventor | Class |
|---|---|---|---|
| 3,630,182 | 12/1971 | Grainger | 123/556 |
| 3,683,624 | 8/1972 | Williams | 60/275 |
| 3,788,796 | 1/1974 | Krippene et al. | 431/2 |
| 3,808,805 | 5/1974 | Mirmotes | 60/274 |
| 3,836,338 | 9/1974 | Arnold | 422/170 |
| 3,884,194 | 5/1975 | Grosseu | 122/7 RR |
| 3,904,349 | 9/1975 | Peterson | 431/184 |
| 4,380,202 | 4/1983 | LaRue | 110/263 |
| 4,403,941 | 9/1983 | Okiura et al. | 431/10 |
| 4,412,810 | 11/1983 | Izuha et al. | 431/186 |
| 4,496,306 | 1/1985 | Okigami et al. | 431/8 |
| 4,501,233 | 2/1985 | Kusaka | 122/406.4 |
| 4,545,307 | 10/1985 | Morita et al. | 110/264 |
| 4,572,110 | 2/1986 | Haellich | 122/7 R |
| 4,654,001 | 3/1987 | LaRue et al. | 431/354 |
| 4,706,612 | 11/1987 | Moreno et al. | 122/7 R |
| 4,739,713 | 4/1988 | Vier et al. | 110/263 |
| 4,748,919 | 6/1988 | Campohenedello et al. | 110/264 |
| 4,790,743 | 12/1988 | Leikert et al. | 431/8 |
| 4,799,461 | 1/1989 | Shigonaka et al. | 122/7 R |
| 4,807,541 | 2/1989 | Masai et a. | 110/262 |
| 4,836,772 | 6/1989 | LaRue | 431/285 |
| 4,838,185 | 6/1989 | Flament | 110/347 |
| 4,881,474 | 11/1989 | Okada et al. | 110/263 |
| 4,907,962 | 3/1990 | Azuhata et al. | 431/174 |
| 4,915,619 | 4/1990 | LaRue | 431/284 |
| 4,928,635 | 5/1990 | Shrlor | 122/7 R |
| 5,022,849 | 6/1991 | Yoshii et al. | 431/2 |
| 5,067,419 | 11/1991 | Kobayashi et al. | 110/234 |
| 5,090,339 | 2/1992 | Okiura et al. | 110/263 |
| 5,092,761 | 3/1992 | Dinicolantonio | 431/115 |
| 5,113,771 | 5/1992 | Riniet et al. | 110/263 |
| 5,129,333 | 7/1992 | Frederick et al. | 110/235 |
| 5,129,818 | 7/1992 | Baisger | 431/4 |
| 5,133,298 | 7/1992 | Ahnger | 122/7 R |
| 5,151,256 | 9/1992 | Kato et al. | 423/210 |
| 5,190,451 | 3/1993 | Goldbach | 431/5 |
| 5,199,355 | 4/1993 | LaRue | 110/261 |
| 5,199,357 | 4/1993 | Garcia-Mallot | 110/347 |
| 5,215,455 | 6/1993 | Dykoma | 431/3 |
| 5,224,334 | 7/1993 | Bell | 60/274 |
| 5,231,937 | 8/1993 | Kobayashi et al. | 110/262 |
| 5,236,354 | 8/1993 | Goldbach et al. | 60/39.02 |
| 5,263,426 | 11/1993 | Morita et al. | 110/265 |
| 5,284,016 | 2/1994 | Stark et al. | 60/303 |
| 5,299,930 | 4/1994 | Weidman | 431/10 |
| 5,320,523 | 6/1994 | Stark | 431/353 |
| 5,584,178 | 12/1996 | Naegeli et al. | 60/749 |

Primary Examiner—Larry Jones
Attorney, Agent, or Firm—Venable, Baetjer, Howard & Civiletti, LLP

[57] ABSTRACT

A method of using internal combustion engine exhaust in a combined cycle power plant is disclosed, wherein the quality and distribution of exhaust to the boiler space of a steam generated electric power plant is controlled to achieve greater system efficiencies. Outside air is blended only with that portion of the exhaust that passes through the burner ports as secondary or higher level combustion gas. The remainder of the exhaust is provided to the boiler space by a route other than through the burner. The highest overall system efficiencies are achieved where the amount of outside air blended with the portion of exhaust that passes through the burner is such that the blend contains about the minimum amount of oxygen required for complete and stable combustion of the selected fuel, where a substantial percentage of the total exhaust is routed to the boiler space by a route other than through the burner, and where the amount of fuel is sufficient to achieve a desired boiler entering temperature upon its combustion.

9 Claims, 2 Drawing Sheets

METHOD OF OPERATING A COMBINED CYCLE POWER PLANT

This application is a continuation-in-part of application Ser. No. 08/352,124 filed Dec. 1, 1994, now U.S. Pat. No. 5,525,053.

I. BACKGROUND OF THE INVENTION

The present invention relates to the use of internal combustion engine exhaust in combined cycle power plants. More particularly, the present invention relates to achieving greater system efficiencies by controlling the quality and distribution of exhaust to the boiler space of a typical steam generated electric power plant.

Where power plant design is concerned, efficiency provides a useful measure of system performance. As the power plant converts energy from one form to another, losses are inevitable. Where the designer reduces such losses, or even transforms the by-products or waste of certain processes into available energy sources, the overall efficiency of the system naturally will increase.

It is known in the art that greater efficiencies in power generation may be achieved by recycling internal combustion engine exhaust as secondary combustion gas and as overfire or underfire air in a typical coal-fired steam generated power plant. In U.S. Pat. No. 4,928,635, which is hereby incorporated by reference, such a system is disclosed. One of the objects of that invention was to make the heat energy of the exhaust available to generate steam. Thus, efficiencies were achieved simply by converting what would otherwise be waste energy into productive energy. At that time, it was necessary to raise the temperature of the exhaust in order to produce high quality steam. It was suggested that refiring a blend of exhaust containing about 13% oxygen and preheated air as secondary combustion gas would be a suitable method for achieving that result. It was suggested further that the total flow of exhaust into the boiler preferably should be about 40–70% of the total gas flow into the boiler.

Upon further investigation, it was discovered that greater overall system efficiencies could be achieved by controlling the amount of oxygen at key locations within the burner, and by routing substantially higher proportions of exhaust to the boiler space directly, as opposed to routing it as secondary or higher level combustion gas, thereby lowering the amount of supplementary firing required in the boiler. The total flow of exhaust into the boiler should constitute a higher percentage of the total gas flow into the boiler than had been previously suggested in order to take full advantage of the thermal energy of the exhaust and to avoid introduction into the boiler, at least as much as possible, of lower temperature gases. The method of the present invention reflects that discovery.

II. SUMMARY OF THE INVENTION

Where internal combustion engine exhaust is used to generate steam for either process requirements or for the production of electricity, it may be necessary to increase the temperature of the exhaust gas from the internal combustion engine to levels which are appropriate for high quality steam production. Refiring the exhaust—burning additional fuel in its presence—accomplishes this result. Combustion of the fuel raises its temperature and that of the surrounding and downstream exhaust, as well as any other gases present.

The amount of fuel that must be burned to raise the temperature of the exhaust depends, of course, on the type of fuel being used. It also depends upon the total amount of gas that must be raised to temperature and the initial temperature of the gas. Greater overall system efficiencies will be realized where the heat added to the system to meet the steam conditions, other than that provided by the exhaust, is minimized, since this heat represents fuel that must be burned. The amount of heat that must be added to the system generally increases as the amount of gas within the system increases.

To be useful fuel must be burned in the presence of oxygen. Generally, it is necessary to provide outside air containing a percentage of oxygen to the burner as secondary combustion gas, thus ensuring that sufficient oxygen will be available to achieve complete and stable combustion of the fuel. However, since the outside air necessarily must enter the system, its temperature also must be raised to satisfy the steam conditions. The more outside air is used, the more heat must be added to the system in the form of burned fuel.

Where exhaust is used as a secondary combustion gas, its greater temperature relative to outside air translates to a reduction in the amount of heat that must be added to satisfy steam conditions. Although the exhaust generally contains some oxygen, it may be insufficient to achieve complete and stable combustion of the fuel. Accordingly, some outside air must be blended with the exhaust to bring the level of oxygen within the blend to an amount sufficient to achieve complete and stable combustion of the fuel provided through the burner. The amount of oxygen necessary to achieve complete and stable combustion, of course, will depend also on the volatility of the fuel being used.

Raising the level of oxygen for the entire amount of exhaust would require the addition of a substantial amount of outside air. To reduce the amount of outside air entering the boiler, outside air is blended only with that portion of the exhaust that passes through the burner as primary combustion gas. The remainder of the exhaust is provided to the boiler space by a route other than through the burner. The highest overall system efficiencies are achieved where the amount of outside air blended with the portion of exhaust that passes through the burner is such that the blend contains about the minimum amount of oxygen required for complete and stable combustion of the selected fuel, where a substantial percentage of the total exhaust is routed to the boiler space by a route other than through the burner, and where the amount of fuel is sufficient to achieve a desired boiler entering temperature upon its combustion.

Greater overall system efficiencies may be achieved by practicing the invention regardless of the initial oxygen content of the exhaust. Likewise, greater efficiencies may be achieved regardless of the specific fuel chosen. The invention provides a method of operation which by its very nature is flexible, adapting itself to whatever potential sources of energy may be available. Existing combined cycle generation plants may be modified at a reasonable cost to permit performance of the method. Likewise, wherever an existing steam generated electric power plant may be adapted for combined cycle duty, the method may be practiced.

The present invention also addresses the production of Nitrogen Oxide pollutants. Nitrogen oxides, known collectively as NOx, are pollutants composed of approximately 90 to 95% NO and 5 to 10% $NO_2$. These pollutants are detrimental to human health, contribute to ozone, and assist in the production of acid rain. Due to their hostile nature, worldwide restrictions on NOx emissions are becoming increasingly stringent, and therefore, an important consideration in the design of fossil fuel power plants. Even though diesel technology continues to make notable strides in the reduction of NOx emissions, the effort falls short of meeting environmental standards such as those imposed by the World Bank. The day when all diesel power plant construction will require NOx control system is imminent. Today, simple cycle diesel power plants must rely on a selective catalytic reduction (SCR) system to destroy NOx—the most expensive and maintenance dependent technology available.

Thermal and fuel NOx are formed during combustion processes. Thermal NOx is formed through high temperature oxidation of nitrogen found in the combustion air. Fuel NOx is produced from burning nitrogen bound in the fuel. Thermal NOx formation is a function of temperature, residence time, and the degree of fuel and air mixing. Above 2200° F., with an excess of $O_2$ present, the formation of thermal NOx is significant and grows at exponential rates with increasing temperature. The present invention prevents the formation of thermal NOx by preventing the combustion temperature from exceeding 2200° F. in the presence of excess oxygen by igniting fuel at substoichiometric conditions, thereby preventing the oxidation of nitrogen.

The formation of fuel NOx depends on fuel type and post-combustion oxygen availability. The more nitrogen in the fuel, the higher the probability of forming NOx. Once a particular fuel has been established, fuel NOx formation depends solely on post-combustion oxygen availability, and, unlike thermal NOx , is independent of temperature. Normally, once combustion takes place, nitrogen radicals will scavenge excess oxygen to form NOx. If oxygen is not available, atomic nitrogen will revert to molecular nitrogen, thus precluding the formation of NOx.

There are three commonly practiced ways to destroy NOx: Selective Catalytic Reduction (SCR), Selective Non-Catalytic Reduction (SNCR), and reburning. SCR is a post-combustion approach which employs ammonia or urea and a catalyst to convert NOx into water and nitrogen. Similar in principle to the SCR, the SNCR uses ammonia to convert NOx into water and nitrogen. Unlike the SCR which can function at gas temperatures as low as 600° F. to promote the reaction of ammonia with NOx, the SNCR requires temperatures ranging from 1600° F to 2200° F. However, the temperature can be lowered to 1300° F. without affecting the destruction rate if, along with the ammonia, hydrogen is injected in the gas stream. In essence, the introduction of hydrogen compensates for the decrease in temperature, and therefore expands the effective temperate range of the SNCR. The more the temperature is dropped below 1600° F., the more hydrogen is required to keep the destruction rate constant. If the temperature is dropped without hydrogen injection, the NOx destruction rate plummets. If the temperature is below 1300° F., NOx destruction rates are low and ammonia will pass the SNCR unreacted; if the temperature is above 2200° F., NOx will be created rather than destroyed. NOx destruction can also be optimized by maintaining the gas temperature and velocity profiles uniform when entering the ammonia injection cross section of the SNCR. This of course would allow the reaction to take place throughout the cross section rather than at certain preferred locations.

Reburning is the most inexpensive method of NOx destruction and it occurs when gas, such as diesel exhaust, is exposed for sufficient time to a temperature above 2200° F. in a fuel-rich, substoichiometric environment. The present invention employs a novel staged combustion process to accomplish NOx reburning and complete combustion. The first two stages ignite fuel in a substoichiometric environment, while the third stage spontaneously combusts unburned carbon by mixing the gas from the previous two stages with an oxygen rich stream (such as diesel exhaust).

The present invention will best be understood in view of the appended figures and the discussion that follows.

III. A BRIEF DESCRIPTION OF THE DRAWINGS

IV. A DETAILED DESCRIPTION OF THE INVENTION

Figure 1:
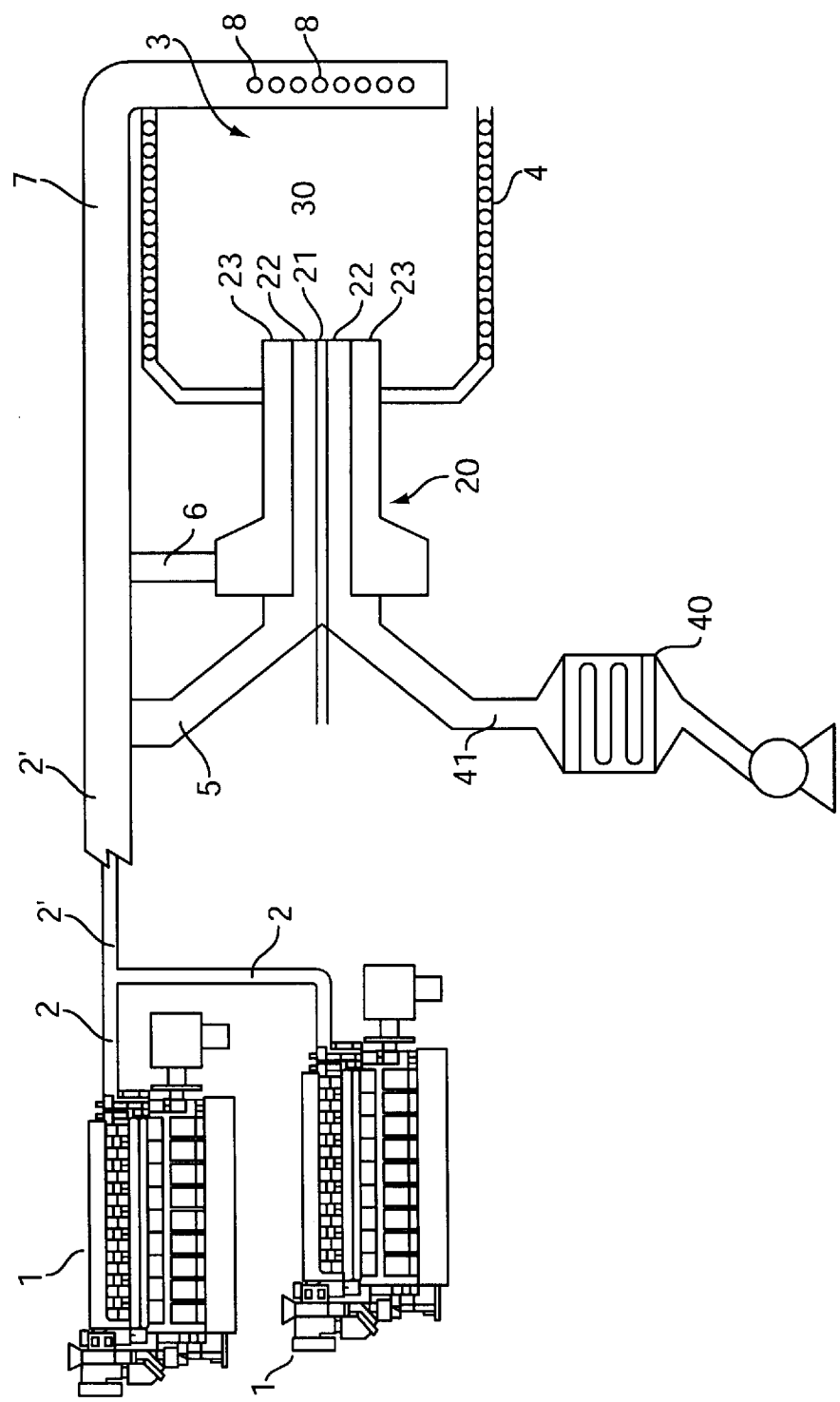
FIG. 1 is a schematic showing the most basic elements common to typical combined cycle generation plants.

FIG. 1 shows the most basic elements common to typical combined cycle generation plants. The plant employs at least one internal combustion engine 1. The engine may be any internal combustion engine, but preferably is a diesel engine. Such an engine may be adapted to burn natural gas, light fuel oil, or heavy fuel oil, among other fuels. Branches 2 and 2' route exhaust from the engines to a typical steam generated electric power plant, all elements of which are not shown in FIG. I for clarity. Shown in FIG. 1 is a boiler space 3, about the periphery of which are disposed steam tubes 4. Water or steam circulates within the steam tubes 4 about the periphery of the boiler space 3. It is at this interface that heat is exchanged between the boiler space 3 and the steam in the steam tubes 4. Exposure to the hot gases within the boiler space 3 causes the temperature of the steam within the steam tubes 4 to rise. The superheated steam is then circulated to a steam turbine generator (not shown), where most of the thermal energy of the steam is transformed into electricity.

Only a portion of the exhaust enters the boiler space through one or more inlets of the burner. As shown in FIG. 1, branches 5 and 6 each route a portion of the exhaust to the burner 20. Branch 7 routes the remainder of the exhaust to the boiler space 3 directly, bypassing the burner 20. This portion of the exhaust enters the boiler space 3 through ports or nozzles 8.

The burner 20 includes a primary inlet or nozzle 21. The primary inlet 21 is adapted to deliver fuel to a combustion zone 30. The fuel may be coal, either micronized or pulverized, liquefied bituminous fuel, heavy fuel oil, residual oil, ormulsion oil, or any other suitable fuel. Selection of an appropriate burner depends on the choice of fuel, the nature of the steam generated electric power plant, and the given steam conditions. Commercially available burners, such as those manufactured by Babcock & Wilcox, are suitable where the burner provides for mixing and blending of fuel and oxygen, maintaining appropriate oxygen levels for the combustion of the selected fuel at the burner tip, and delivering secondary or higher level combustion gases. The Babcock & Wilcox XCL burner, as well as adaptations and subsequent generations of such burners, are most preferred. Where coal is the fuel, the average oxygen level at the burner tip is preferably about 14.5 percent. Where heavy fuel oil or natural gas is used, the level is preferably about 14.1 percent and 13 percent, respectively.

Preferably, the fuel is blended with an amount of air sufficient to carry or transport the fuel. Benefits may be enhanced by endeavoring to maintain a reducing atmosphere in a portion of the combustion zone 30, and permitting combustion to proceed in stages where secondary, tertiary, or higher level combustion gas streams supply the oxygen necessary to complete successive stages of combustion.

Exhaust routed by branches 5 and 6 eventually enters the boiler space through burner inlets 22 and 23. Preferably, the burner exhaust flow is at most 40 percent of the total exhaust flow that eventually will be delivered to the boiler space 3. Most preferably, the burner exhaust flow is about 20 percent of the total exhaust flow that eventually will be delivered to the boiler space 3. The burner exhaust flow functions as secondary and tertiary combustion gas, which in the current design is delivered in circumferential rings about the primary burner inlet 21, and provides shape, stability, and oxygen to the flame. Different geometries can be used to tailor the process to a given need.

The oxygen content of the exhaust routed by branch 5 is normally insufficient to achieve complete and stable combustion of the fuel. Additional oxygen must be supplied to the exhaust flow. This oxygen is supplied by blending outside air with the exhaust routed by branch 5. Preferably, the outside air is preheated by passing it through a steam coil air heater 40 before routing it by branch 41 to the burner 20. Preheating reduces the amount of heat which subsequently must be added to raise the temperature of air, and thus reduces the amount of fuel that must be burned. Optimum efficiency will be achieved where the amount of outside air that is blended with the exhaust flow is such that it supplies the minimum oxygen supplement necessary to achieve complete and stable combustion of the fuel, which translates generally to the minimum amount of outside air necessary to achieve the same purpose.

Exhaust routed by branch 7 bypasses the burner 20. The bypass exhaust flow enters the boiler space 3 downstream of the combustion zone 30 and preferably is delivered to the boiler space 3 through nozzles 8 in a wall or walls of the boiler space 3. After the bypass exhaust flow enters the boiler space 3, it mixes with the combustion products and the burner exhaust flow (now at an elevated temperature). Upon mixing, the gases tend toward a uniform average boiler entering temperature. Preferably, the bypass exhaust flow is at least about 60 percent of the total exhaust flow that will be delivered to the boiler space 3. Most preferably, the bypass exhaust flow is at least about 80 percent of the total exhaust flow that will be delivered to the boiler space 3. Optimum efficiencies will be achieved where the average boiler entering temperature is the minimum necessary to achieve the given steam conditions.

Figure 2:
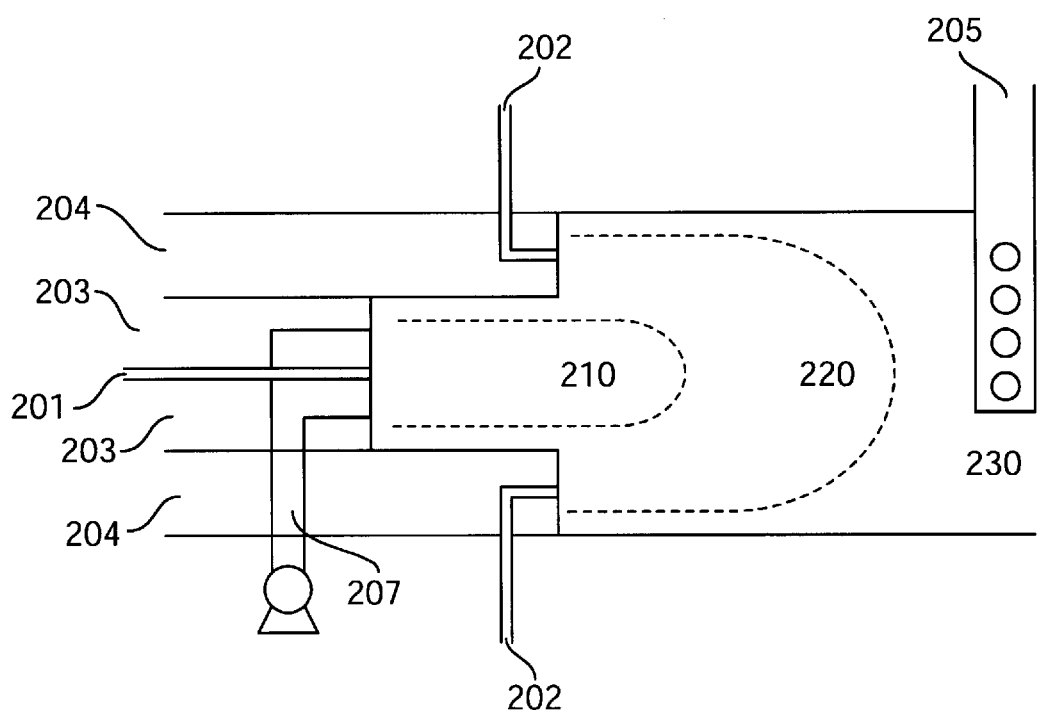
FIG. 2 is a simplified cross section showing the staged combustion process

The preferred system includes the staged combustion process shown by FIG. 2. The first stage of combustion occurs in region 210. Exhaust gases 203 are mixed with fuel 201 and a heated air stream 207. When exhaust from a diesel engine is used, the exhaust gases are approximately 600 degrees and contain approximately 13 percent oxygen. The level of oxygen must be raised to approximately 14.5 percent (when coal is serving as the fuel) in order to attain combustion. The oxygen content of the mixture is raised through the addition of preheated air 207. The combustion in the first two stages is substoichiometric, thereby preventing the formation of additional NOx. The first combustion stage raises gas temperatures and consumes approximately 80 to 90 percent of the total fuel input. Only enough air is added to bring the mixture up to stoichiometric conditions. The amount of air added in the burner will depend on the type of fuel being used. For example, when natural gas is used no air is required to be added to the exhaust stream. Each type of fuel will require a different minimum level of Oxygen for combustion. During the first stage the minimum amount of fuel and air required for combustion to occur at the autoignition point are added.

Immediately following the first combustion, the second combustion takes place in region 220 and destroys NOx via reburning. Exhaust gases 204 and fuel 202 are mixed with the first stage combustion gases. No air is added in the second stage of combustion. NOx removal occurs during the second stage. The amount of NOx reduction from reburning can be as high as 50% of the NOx contained in the portion of exhaust sent to the burners. For example, if 50% of exhaust is bypassed and 50% is sent to the burners where 50% NOx reduction is attained, then the overall NOx reduction is 25%. If the exhaust from the diesels contains 14 g/kWh, reburning would reduce the level to 11.5 g/kWh.

After the second stage of combustion the bypass exhaust stream 205 is added. The oxygen rich bypass exhaust gases mix with high temperature gases resulting from the combustion process. This mixing takes place in region 230, resulting in the spontaneous combustion of any unburned carbon remaining from the fuel added in earlier stages. This spontaneous combustion will occur resulting in a bulk temperature below 2200° F. in order to minimize the formation of thermal NOx. The temperature of the mixture is maintained due to the mixing of the relatively low temperature oxygen rich stream (600° F. in the case of diesel exhaust), with the high temperature combustion gases (approximately 2200° to 2600° F.). In this stage the formation of fuel NOx is negligible since most of the fuel has already been ignited.

The NOx reduction in the present invention occurs in two steps. First, NOx reburning is accomplished followed by NOx destruction in an SNCR or SCR. In the primary combustion stage, approximately 80 to 90% of the desired fuel input is ignited at approximately 0.8 to 0.99 of stoichiometry, the stoichiometric ratio can be tailored to particular circumstances. As a result of this combustion, the temperature of the exhaust gas is raised to levels necessary to accomplish NOx reburning in the secondary combustion stage. Moreover, since the combustion takes place in an oxygen deficient environment, NOx formation is precluded.

In the secondary combustion stage, the balance of the fuel input is ignited at 0.7 to 0.99 of stoichiometry, the stoichiometric ratio can be tailored to particular circumstances. Because of the primary combustion, the exhaust gas temperature in this stage is high enough (above 2200° F.) to accomplish reburning. The deficiency of oxygen again prevents thermal NOx formation. Since secondary combustion must be accomplished at a temperature above 2200° F. for reburning to be effective, the secondary combustion zone 220 should be adjacent to the primary combustion zone 210. Sufficient residence time (0.5 to 1.5 seconds) is maintained in the second stage for effective reburning.

In the tertiary combustion stage, an oxygen rich stream 205 mixes with the exhaust gas from the previous two combustion stages in zone 230. No fuel is added in the third stage. In this final stage, residual fuel (or unburned carbon) spontaneously ignites to complete the overall combustion process.

The bypass approach of the present invention, improves the efficiency of the cycle in two ways. First, it utilizes the oxygen in the diesel exhaust which is at approximately 13 percent by volume, and second, it only uses a portion of exhaust to ignite the fuel while the balance of the exhaust bypasses the burner. Since the oxygen level of the exhaust sent to the burner needs to be elevated to approximately 14.5 percent by the addition of fresh air to accomplish combustion, the bypass technique minimizes the amount of fresh air added to the system, and thus makes the process more efficient. The bypass approach only adds air to the portion of exhaust which will be used to ignite fuel, the balance of the exhaust bypasses the burner and is subsequently mixed with the "burned" stream to yield a desired bulk gas temperature. This desired bulk temperature depends in part on whether an SCR or SNCR is used to complete NOx removal. Cost of the equipment is also a consideration. The preferred method contemplates using an SNCR prior to heat transfer in the boiler. The desired bulk temperature for an SNCR is in the range of 1300° F. to 1600° F. Another embodiment has an SCR downstream of the boiler. The desired bulk temperature for the system with an SCR would vary depending on pressure in the boiler but normally would fall in the range of 900° F. to 1500° F., at a temperature sufficient to produce superheated steam. The method of the invention can be demonstrated further with reference to a simple system comprising the following components and operational constraints or characteristics:

(1) one VASA 18V46 diesel engine generator at full load on No. 6 fuel oil;

(2) a boiler fired on No. 6 fuel oil. Fresh combustion air is added to the fuel to maintain 14.6 percent oxygen (wet weight basis) in burner windbox. Burner fired to maintain 10 percent minimum excess oxygen at burner exit, resulting in approximately 2800 degrees F. firing temperature leaving the burner. Windbox temperature maintained at approximately 563 degrees F.

(3) steam generation based on 300 degrees F economizer outlet temperature, no blowdown. Steam generated at conditions 1300 psig/950 degrees F. feed water;

(4) fuel input based on No. 6 fuel oil, LHV basis, 17,233 BTU/lb.

(5) ambient conditions 86 degrees F., 60 percent R.H., sea level. Typical operating parameters for this system are provided in the following Table:

The proposed system may be understood more clearly if one treats the boiler as a separate component from the internal combustion engine. The exhaust contributes a fixed amount of heat to the boiler and fuel is added to this fixed level to enable the boiler to produce steam of a given quality. Based on the amount of fuel required, which amount necessarily is a function of the quality and nature of the fuel, an amount of oxygen must be available in and around the combustion zone to achieve complete and stable combustion of the fuel. As shown in the Table, the point of greatest apparent boiler efficiency is the point where the minimum amount of fuel is added to satisfy the steam conditions. The minimum boiler entering temperature (maximum bypass) in this example is approximately 1230 degrees Fahrenheit, providing an apparent boiler efficiency of 150 percent.

With a goal to provide an efficient combined system for large power generation using diesel engines as the base and retaining the fuel flexible characteristics of diesel combined cycle systems, a preferred arrangement with which the method may be practiced employs six VASA 18V46 diesels in combination with a three pressure reheat heat recovery steam generator. Nonetheless, recognizing that the diesel exhaust provides a fixed quantity of recoverable heat and that fuel may be added to the exhaust in order to overcome boiler pinch points for each steam cycle, it is clear that an entire array of potential power plant sizes using reheat or non-reheat steam turbines may be created.

Heavy fuel oil is provided to the diesels at 885.8 MBTU/H/172330.0 BTU/LB. The total diesel generator output is 90.7 MW. The burner exhaust flow is 271.3 KLB/H at 660 degrees Fahrenheit. The bypass exhaust flow is 1085.4

| No. 6 Oil Fired Diesel Combined Cycle Typical Operating Parameters | | | | | |
|---|---|---|---|---|---|
| Portion of Diesel Exhaust Mass Flow to Burner | 100% | 80% | 60% | 40% | 20% |
| Portion of Total Boiler Gas Mass Flow from Burner | 100% | 83.6% | 65.7% | 45.4% | 24.0% |
| Portion of Total Boiler Gas Mass Flow Overfire | 0% | 16.4% | 34.3% | 54.6% | 76.0% |
| Diesel Exhaust $O_2$ (Vol. % wet) | 11.6% | 11.6% | 11.6% | 11.6% | 11.6% |
| Windbox $O_2$ Vol. % wet) | 13.1% | 13.1% | 13.1% | 13.1% | 13.1% |
| (Wt. % wet) | 14.6% | 14.6% | 14.6% | 14.6% | 14.6% |
| $O_2$ at Burner Exit (Vol. % wet) | 1.2% | 1.2% | 1.2% | 1.2% | 1.2% |
| $O_2$ at Econ Outlet (Vol. % wset) | 1.2% | 2.9% | 4.8% | 6.9% | 9.1% |
| Gas Temp at Boiler Inlet (°F.) | 2800 | 2484 | 2126 | 1705 | 1233 |
| Gas Temp at Econ Outlet (°F.) | 300 | 300 | 300 | 300 | 300 |
| Fresh Air to total Diesel Exhaust Flow Ratio (lb/lb) | 0.218 | 0.174 | 0.131 | 0.082 | 0.043 |
| Steam Produced per Diesel KW Output (lb/kW) | 11.60 | 9.48 | 7.40 | 5.23 | 3.20 |
| Steam Produced per lb of Diesel Exhaust (lb steam/lb exhaust) | 0.776 | 0.635 | 0.496 | 0.351 | 0.214 |
| Gross Boiler Efficiency (%) | 108% | 111% | 115% | 124% | 150% |

Thus, for given steam conditions, optimum efficiencies are achieved where the addition of fuel and air is minimized or, conversely, where a substantial portion of the exhaust from the internal combustion engine enters the boiler space by a route other than through the burner.

KLB/H, or about 80 percent of the total exhaust flow that will enter the boiler space, at 660 degrees Fahrenheit. Outside air at 88 degrees and relative humidity of 80 percent is preheated to 300 degrees Fahrenheit and is delivered to and blended with the burner exhaust flow at 48.25 KLB/H.

No. 6 heavy fuel oil is provided to the burner at 231.1 MBTU/H/17233.0/LB. Alternative fuels include natural gas or light fuel oil. The use of ormulsion or coal, of course, would require some change in the steam system portion of the plant. Generally, where more difficult fuels are involved, the three pressure boiler cannot be used and a two pressure system may be employed. Particularly dirty fuels may require that specific environmental control measures be employed after the steam system portion of the plant.

Under these conditions, a boiler entering temperature of 1230 degrees Fahrenheit and a gross heat rate of 7016.6 BTU/KWH (lower heating value, gross plant output) is achieved. The gross plant output and net output are 130.6 MW and 126.7 MW, respectively, with the steam turbine operating at 1465 psig/1000 degrees Fahrenheit to produce 39.9 MW.

Where the bypass exhaust flow is decreased to 60 percent, a higher gross heat rate of 7172.51 BTU/KWH (lower heating value, gross plant output) is achieved. The gross plant output and net output are 160.0 MW and 155.2 MW, respectively, with the steam turbine operating at 1465 psig/1000 degrees Fahrenheit to produce 69.3 MW. Increased consumption in fuel and outside air account for the difference in efficiency. Relative to the previous arrangement, the burner exhaust flow has increased to 5421.KLB/H at 660 degrees Fahrenheit. The bypass exhaust flow has decreased to 8140.0 KLB/H at 660 degrees Fahrenheit. Outside air at 88 degrees and relative humidity of 80 percent is preheated to 300 degrees Fahrenheit and is delivered to and blended with the burner exhaust flow at an increased rate of 96.5 KLB/H. No. 6 heavy fuel oil is provided to the burner at the increased rate of 482.2 MBTU/H/172330.0 BTULB.

It must be appreciated that the method of the present invention may be performed in a variety of ways, only some of which have been fully described above. Without departing from its spirit of essential character, the invention may be performed in other ways. The foregoing is to be considered in all aspects only as illustrative and non-restrictive, and the scope of the invention is, therefore, described by the appended claims rather than by the foregoing description. All changes which come within the meaning and range of equivalency of the claims are embraced within their scope.

We claim:

1. A method of operating a power plant comprising an internal combustion engine, a burner and a boiler space comprising:

routing a portion of the exhaust from the internal combustion engine to the burner;

adding fuel and air to the exhaust in order to form a mixture;

combusting said mixture in a primary combustion zone, creating burner exhaust;

routing a second portion of the engine exhaust from the internal combustion space to mix with said burner exhaust and fuel, creating a second mixture;

combusting said second mixture in a secondary combustion zone creating secondary burner exhaust; and transferring the heat from said secondary burner exhaust to feedwater and steam in order to create steam.

2. The method of claim 1, further comprising the step of:

routing a final portion of the exhaust from the internal combustion engine to mix with said secondary exhaust, prior to said heat transfer step, creating a bulk gas.

3. The method of claim 2, further comprising the step of:

removing pollutants from said bulk gas by injecting liquid ammonia into said bulk gas prior to said heat transfer step.

4. The method of claim 2, further comprising the step of:

removing pollutants from said bulk gas after said heat transfer step.

5. The method of claim 1, wherein said transferring step results in superheated steam for use in a turbine.

6. A method of removing pollutants from the exhaust of an internal combustion engine by substoichiometric staged reburning comprising the steps of:

mixing fuel, air and a portion of said engine exhaust to create a first mixture;

combusting said first mixture, creating first stage exhaust;

mixing fuel and another portion of said engine exhaust with said first stage exhaust to create a second mixture;

combusting said second mixture, creating a second stage exhaust;

mixing an oxygen rich stream with said second stage exhaust to form a third mixture;

spontaneously combusting said third mixture, creating a bulk mixture;

lowering the temperature of said bulk mixture; and allowing said bulk mixture to escape into the atmosphere.

7. The method of claim 6, wherein said oxygen rich stream is a final portion of said engine exhaust which bypasses the first and second combusting steps.

8. The method of claim 6, further comprising the step of:

removing pollutants from said bulk mixture by injecting liquid ammonia into said bulk mixture prior to said temperature lowering step.

9. The method of claim 6, further comprising the step of:

removing pollutants by selective catalytic reduction after said temperature lowering step.

* * * * *